P. J. SIMMEN.
AUTOMATIC MOVING VEHICLE CONTROL.
APPLICATION FILED MAY 5, 1915.

1,308,558.

Patented July 1, 1919.
4 SHEETS—SHEET 2.

Inventor
Paul J. Simmen

By William R. Baird
his Attorney

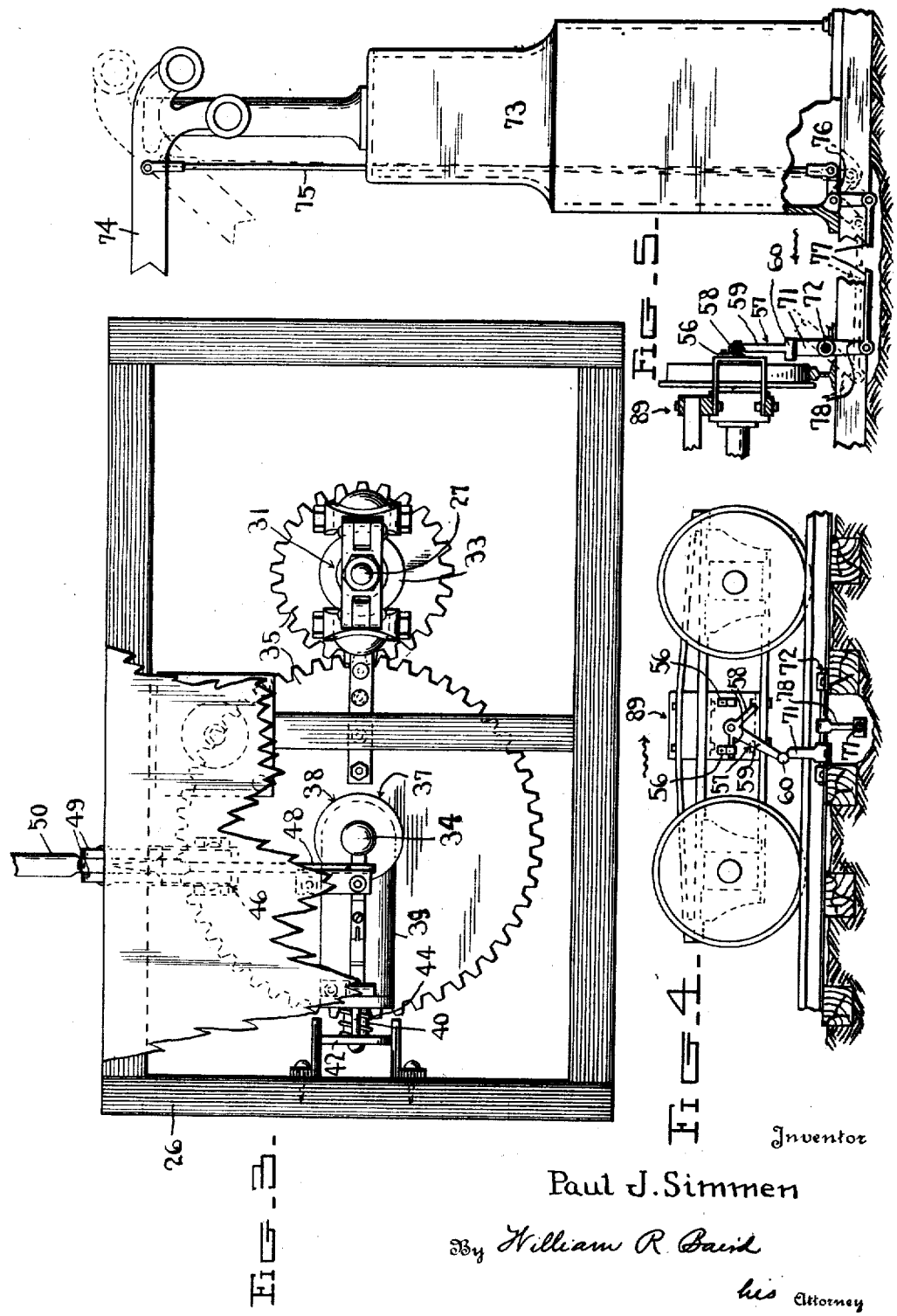

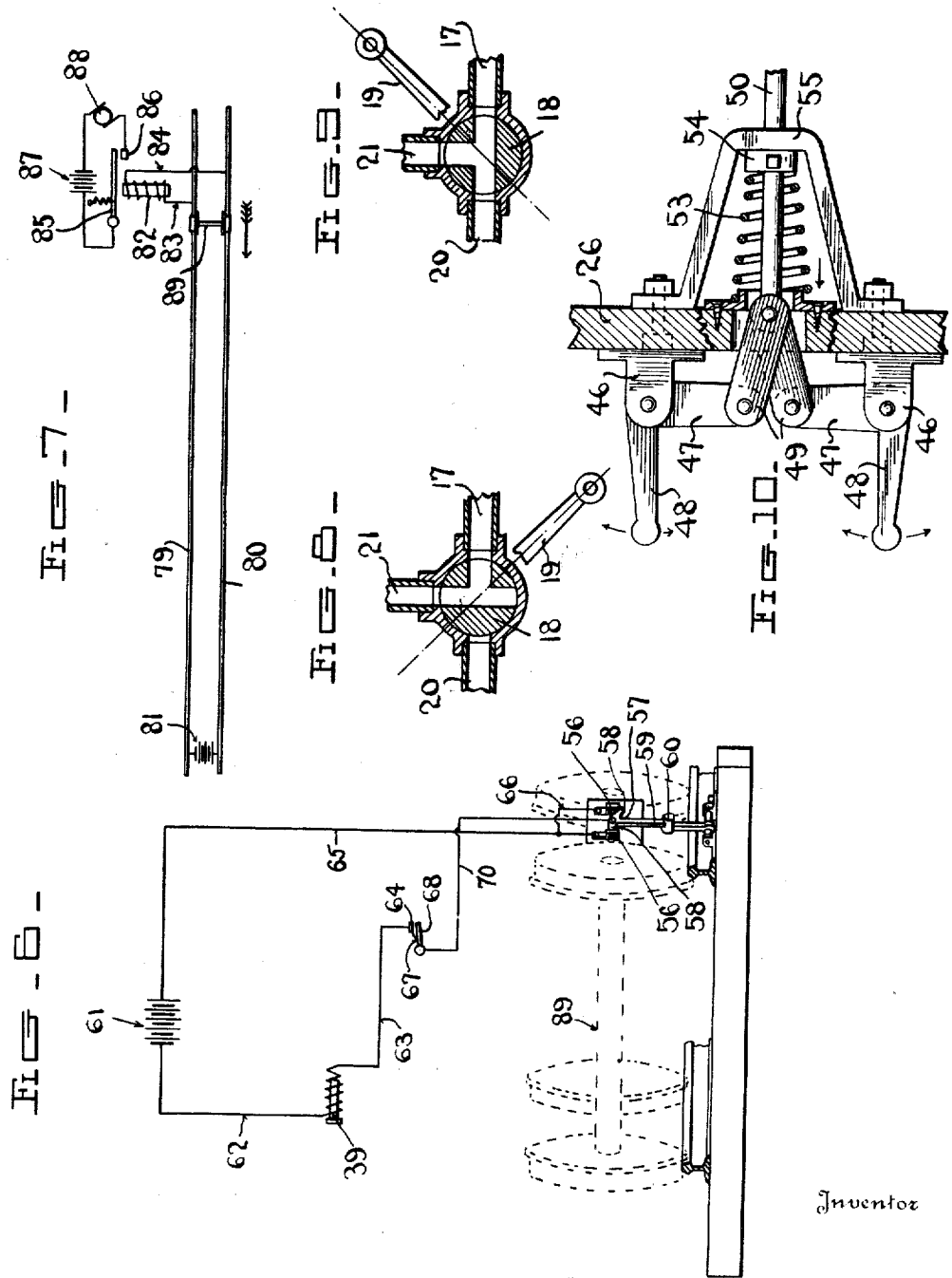

UNITED STATES PATENT OFFICE.

PAUL JOHN SIMMEN, OF BUFFALO, NEW YORK.

AUTOMATIC MOVING-VEHICLE CONTROL.

1,308,558.　　　Specification of Letters Patent.　　Patented July 1, 1919.

Original application filed April 14, 1908, Serial No. 427,080. Divided and this application filed May 5, 1915. Serial No. 26,086.

*To all whom it may concern:*

Be it known that I, PAUL JOHN SIMMEN, a citizen of the United States, residing at Buffalo, in the county of Erie and State of New York, have invented certain new and useful Improvements in Automatic Moving-Vehicle Controls, of which the following is a specification.

The object of the invention is to control the speed of a vehicle, and particularly to provide such a control if the person in charge thereof fails to observe danger, or other signals, which he should observe, said control taking place whether the vehicle be traveling forward or backward. Its novelty consists in the construction and adaptation of the parts, as will be more fully hereinafter pointed out. The present application is a division of Serial No. 427,080, filed Apr. 14, 1908.

In the accompanying drawings:—

Fig. 3 is a plan view of the structure shown in Fig. 2.

Fig. 4 is a detail side elevation of the front truck of a locomotive and with the switch mechanism thereon and the associated wayside mechanism.

Fig. 5 is a cross sectional view of the structure shown in Fig. 4, and showing the semaphore mechanism.

Fig. 6 is a diagrammatic view illustrating the controlling circuit.

Fig. 7 is a diagrammatic view of the wayside mechanism, including the electric circuits thereof.

Figs. 8 and 9 are detail sectional views of the valve which controls the air brake and throttle valve mechanisms.

Fig. 10 is a detail view of the devices operated on by the controller.

Similar reference numerals designate corresponding parts in all the figures of the drawings.

Figure 1:
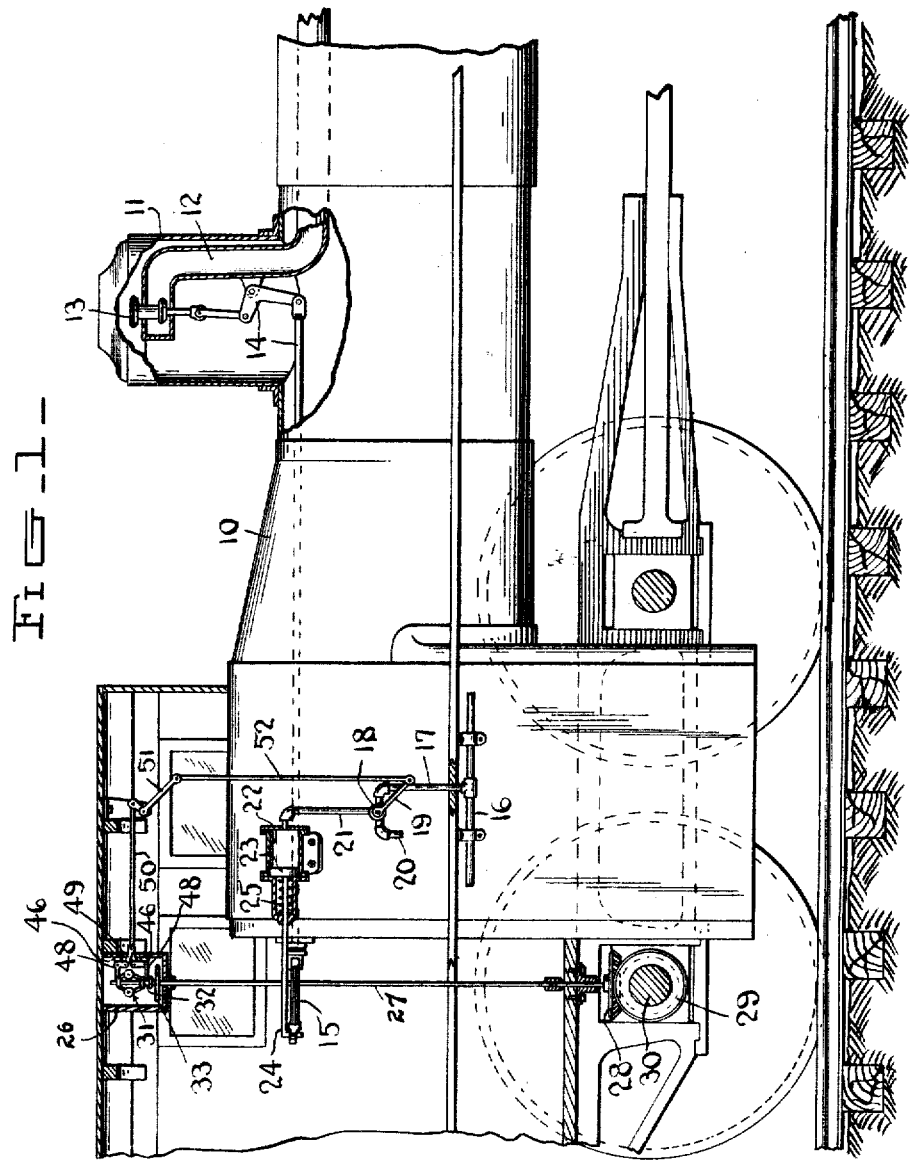
Figure 1 is a side elevation, partially in section, of a portion of a locomotive, equipped with the mechanism.
Figure 2:
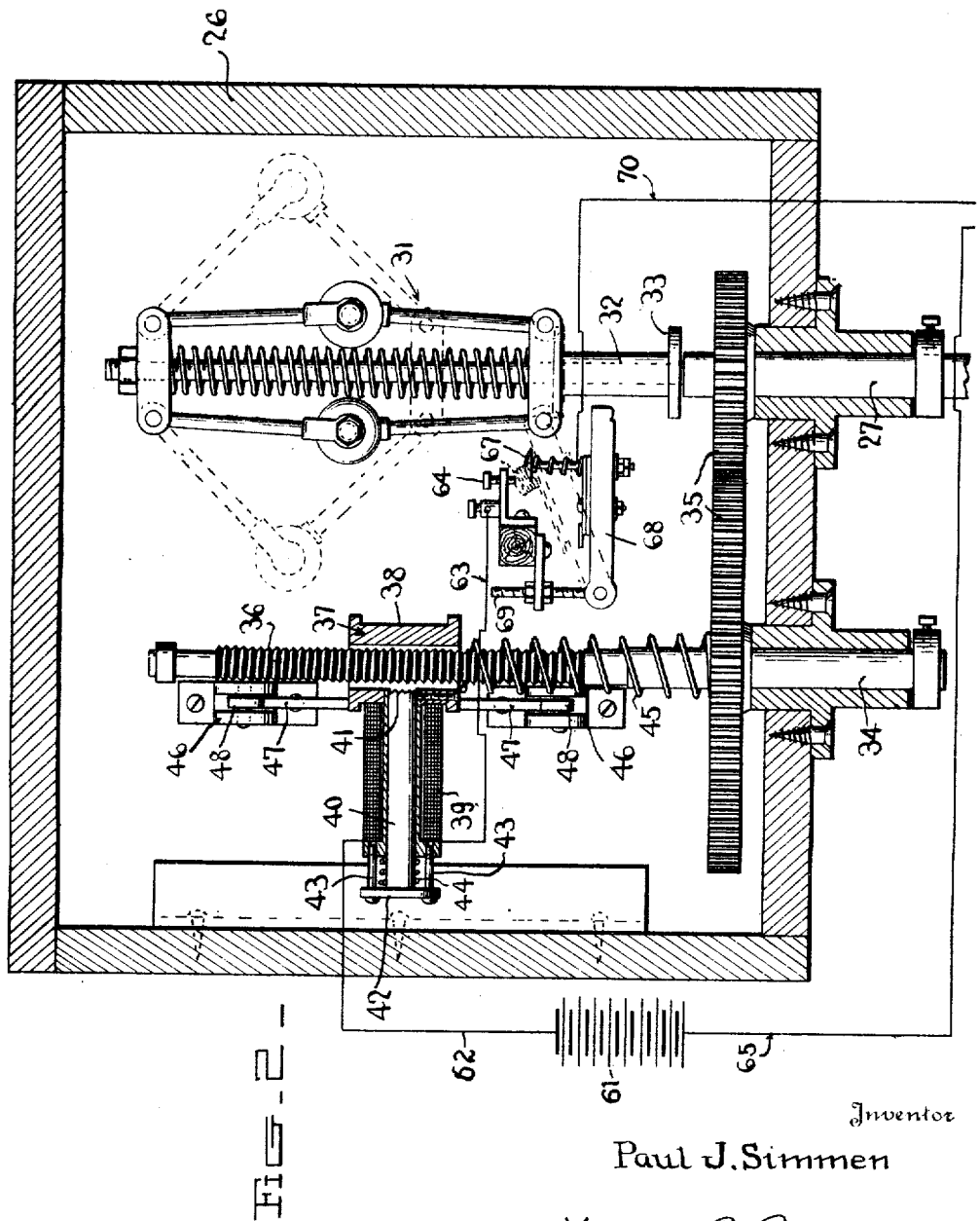
Fig. 2 is a detail elevation on an enlarged scale partially in section and partially diagrammatic, showing the control mechanism.

In the drawings, a locomotive is illustrated, and is designated generally by the reference numeral 10. Leading from the steam dome 11 thereof to the cylinders (not shown) is the usual steam supply pipe 12 controlled by a throttle valve 13 having the usual connections 14 with an actuating lever 15 suitably arranged in the cab of said locomotive. A portion 16 of a pipe forming a part of the usual air brake system is shown, from which leads an outlet pipe 17 controlled by a three-way valve 18, located therein, said valve having an operating lever 19. The pipe 17 has a discharge end 20 and a branch 21 which leads to a cylinder 22 mounted on the locomotive, and containing a reciprocatory piston 23. The said piston is provided with a rod 24 suitably engaged with the actuating lever 15, so that the movement of said piston 23 to the right, as shown in Fig. 1, will cause the movement of the lever 15, and consequently the closing of the throttle valve 13. This movement of the piston 23 is secured by a spring 25 located in an extension of the cylinder, and bearing against the piston. The piston is, however, normally held in the position illustrated in Fig. 1 by the compressed air of the brake system, for as illustrated in Fig. 8, when the valve is in the position shown in Figs. 1 and 8, the air from said air brake system has free access to the piston, and the power thereof is sufficient to overcome the force of the spring. If, however, the valve 18 is turned to the position shown in Fig. 9, it will be evident that both the air brake system and the cylinder 22 can exhaust through the outlet 20. Consequently the brakes will be applied, and the piston 23 will be moved to the right by the spring 25. As a result, the throttle valve 13 will be closed and the steam thus cut off from the locomotive cylinder.

For the purpose of effecting the actuation of the valve 18, the following mechanism is preferably employed. Located in the cab of the locomotive is a box or casing 26, in which is journaled the upper end of a vertical shaft or spindle 27, the lower end thereof carrying a beveled gear 28 that is in mesh with a corresponding gear 29 fixed to one of the axles 30 of the locomotive. As a consequence, the shaft 27 will be rotated by the locomotive when the same is moving either forwardly or rearwardly. The portion of the shaft 27 within the casing 26 carries a well known type of centrifugal speed governor 31, the lower movable member 32 of which is in the form of a sleeve having a flange 33. Another vertical shaft or spindle 34, journaled in the casing 26, is driven by the shaft 27 through the medium of intermeshing gears 35, respectively, mounted on said shafts.

The shaft 34 has a portion within the casing peripherally threaded, as illustrated at 36, and slidable along said portion is a controller 37 which includes a collar 38 having a bore through which the shaft 34 passes, said bore being of sufficient diameter to clear the threads 36. This collar carries on one side an outstanding electro-magnet 39, within which reciprocates a core or armature 40, the inner end of said armature being provided with teeth 41 that are movable into and out of mesh with the thread 36. The outer end of said core has a head 42 slidably mounted on guide pins 43 carried by the electro-magnet. A coiled spring 44 is interposed between the head 42 and the adjacent end of the electro-magnet and serves to normally hold the core 40 in its retracted position, with the teeth 41 out of engagement with the thread 36. The controller 37 is normally held in a position substantially midway of the ends of the thread 36 by a coiled spring 45 surrounding the shaft 34, the collar 38 resting upon the threads.

It will be evident that with this construction, if the locomotive is in movement, the shaft 34 will be rotated in one direction or the other, depending upon the direction of movement of the locomotive, and if the electro-magnet 39 is energized, the core 40 will be drawn thereinto, so that the shaft 41 will be engaged with the threads 36, whereupon the controller will be caused to move longitudinally on the shaft 34 either upwardly or downwardly. If upwardly and the electro-magnet is deënergized, the spring 44 will react to withdraw the core 40 so that its teeth 41 will be disengaged from the threads 36 and the controller will drop to its normal position. Or if it is moved downwardly, the spring 45 will be compressed, and when the controller is released from the shaft 34 by the deënergization of the electro-magnet 39, said spring will again raise the controller to its normal position.

Mounted on suitable brackets 46 on the inside of the casing 26, is a pair of bell crank levers 47, having arms 48 that project inwardly into the path of the controller 37 above and below the same. These bell cranks have link connections 49 with a rod 50, which rod is pivoted to a bell crank 51 that in turn has a link connection 52 with the actuating lever 19 of the controlling valve 18. Therefore, if the controller 37 is moved sufficiently far in either direction by the shaft 34, it will engage one or the other of the arms 48 of the bell cranks 47 and will swing said arms, thereby drawing upon the rod 50, and through the connections described, will cause the valve actuating lever 19 to be shifted from the position shown in Figs. 1 and 8 to the position shown in Fig. 9 with the corresponding change of the valve. The rod 50 and the various parts connected therewith are returned to their normal positions by means of a coiled spring 53, which spring has a bearing at one end against one side of the casing 26, and at its other end it bears against a collar 54 adjustably mounted upon the rod 50.

The movement of the rod 50 under the action of the spring 53, is limited by a stop yoke 55 through which the rod passes, said stop yoke being secured to the casing 26 and having a portion in the path of the collar 54, as shown in Fig. 10.

The energization and deënergization of the electro-magnet 39 for the purpose of causing the movement of the controller 37 is effected by mechanism shown diagrammatically in Figs. 6 and 7. Mounted on the truck of the locomotive, is a double acting switch, the same comprising a pair of spaced contact elements 56 and a coöperating switch element, comprising a three-armed lever 57, the oppositely extending arms 58 of which are movable into and out of engagement alternately with the contact elements 56, the third arm 59 being in the form of a depending actuating member having an enlarged head 60 at its lower end. A source of electrical energy is shown in the form of a battery 61, suitably mounted on the locomotive and one pole thereof, is electrically connected as illustrated at 62 with one terminal of the electro-magnet 39. The other terminal of said magnet is connected by an electrical conductor 63 with one terminal 64 of a switch. Leading from the other pole of the battery is an electrical conductor 65 having branches 66 connected to the contact elements 56 of the truck-carried switch. Coacting with the terminal 64, is a spring-pressed terminal 67 carried by a swinging arm 68 adjustably mounted as shown at 69 in the casing, the free end of the arm 68 being located in the path of the flange 33 of the speed governor element 32. The contact element 67 is connected by an electrical conductor 70 with the switch member 57.

It will thus be evident that if the switch member 57 is swung in either direction to contact with one or the other of the elements 56, and if the speed governor 31 is operating at a speed sufficient to cause the flange 33 to engage the arm 68 and bring the contact element 67 into engagement with the contact element 64, a circuit on the cab will be established, beginning with the battery 61, and comprising the conductor 65, one of the branches 66, one of the contacts 56, the arm 58 engaged therewith, the conductor 70, the switch elements 67 and 64, the conductor 63, the electro-magnet 39, the conductor 62 and the battery 61. As a consequence, the electro-magnet will be energized, the core 40 will be moved so as to bring its teeth 41 into engagement with the screw 36, and the controller 37 will be caused to move along the shaft 34. If moved sufficiently far, one of the bell crank levers 48 will be engaged and the air brakes applied, and the steam shut off.

Various means may be employed for effecting the operation of the switch member 57. For example, there is shown a trip arm 71 mounted alongside the track, and carried by a rocker shaft 72 suitably journaled on the ties. The upper end of this trip arm 71 can be swung into and out of the path of the head 60 of the arm 59 of the switch member 57. In the present embodiment, this trip arm 71 moves in unison with and is actuated by a semaphore signal. A hollow semaphore stand is shown at 73, and pivoted on its upper end, is a target 74 of any suitable design. This target has pivoted thereto a link 75 connected to a bell crank 76, which in turn has a link connection 77 with an arm 78 mounted on the rocker shaft 72. The arrangement is such that if the semaphore is placed at danger position, as illustrated in full lines in Fig. 5, then the arm 71 will be brought into the path of the arms 59, but if the semaphore drops to a clear position, as illustrated in dotted lines in Fig. 5, then the trip arm 71 will be moved out of the path of the arm 59 and said arm will pass the same without being swung thereby.

Obviously the semaphore may be manually actuated by well known means. It may, however, be automatically controlled, and automatic controlling means is diagrammatically illustrated in Fig. 7. In this arrangement, the track is divided into blocks, one of which is illustrated in Fig. 7, the rails thereof being respectively designated 79 and 80. These rails are connected at one end of the block to opposite poles of a battery 81, and at the opposite end of the block is located a relay 82, the terminals 83 and 84 of which are respectively connected to the rails 79 and 80. The armature 85 actuated by the relay 82 constitutes one of the members of an electric switch, the other member being shown at 86. This switch 85—86 is in circuit with a source of electrical energy 87, such circuit also including a semaphore actuating motor 88.

With this system, it will be evident that as long as there is no vehicle on the block rails, a circuit will be established, comprising the battery 81, the rails 79 and 80 and the relay 82. As a consequence, the armature 85 will be drawn to a position to contact with the element 86 and a second circuit will thus be closed, comprising the battery 87, the relay armature 85, the contact element 86, and the semaphore motor 88. This motor, when in a closed circuit, serves to hold the semaphore 74 in its "clear" position. If, however, a vehicle, as 89, comes into the block, it will be evident that the current passing to the relay 82 will be shunted through said vehicle, or in other words, the battery 81 will be short-circuited. As a consequence, the relay 82 will be deënergized, the armature 85 will disengage the contact element 86, and the circuit through the semaphore motor 88 being open, the semaphore can drop to the danger position. When this occurs, as already shown the trip arm 71 will swing into the path of the switch arm 59, so that if the locomotive 10 should enter the block, the cab circuit will be closed, providing the speed of the locomotive is sufficiently great to close the switch 64—67. If this takes place, the controller, as already described, will be thrown into operation, and if the engineer does not reduce his speed, the locomotive will be automatically brought to the predetermined minimum speed.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In apparatus of the character set forth, the combination with a vehicle, of traffic controlling means, an electrically controlled device for effecting the operation of the traffic controlling means, a source of electrical energy, a circuit including said source of electrical energy and the said device, means operating in accordance with the speed of the vehicle, mechanical means including wayside mechanism for conditioning said circuit so as to be opened or closed by the means operating in accordance with the speed of the vehicle.

2. In apparatus of the character set forth, the combination with a vehicle and traffic controlling means, of a controller for effecting the actuation of the traffic controlling means, controlling means operating in accordance with the speed of the vehicle, a mechanical trip operated device, and electrical means for governing the movement of the controller, including a circuit, a circuit closer in said circuit actuated by the trip operated device for conditioning said circuit to be operatively responsive to the controlling means operating in accordance with the speed of the vehicle, and a circuit controller in said circuit for closing or opening said circuit after being conditioned by said circuit closer.

3. In apparatus of the character set forth, the combination with a vehicle, of traffic controlling means, an electrically controlled device for effecting the operation of the traffic controlling means, a source of electrical energy, a circuit including said source of electrical energy and the said device, said circuit being open at a plurality of points, means operating in accordance with the speed of the vehicle for controlling the circuit at one point, and mechanical means including wayside mechanism for closing it at another point.

4. In apparatus of the character set forth, the combination with a vehicle, of traffic controlling means, an electrically controlled device for effecting the operation of the traffic controlling means, a source of electrical energy, a circuit including said source of electrical energy and the said device, said circuit being open at a plurality of points, means operating in accordance with the speed of the vehicle for controlling the circuit at one point, a switch for closing it at another point, and a mechanical device along the way for engaging and actuating the switch to close the circuit.

5. In apparatus of the character set forth, the combination with a vehicle, of traffic controlling means, an electrically controlled device for effecting the operation of the traffic controlling means, a source of electrical energy, a circuit including said source of electrical energy and the said device, said circuit being open at a plurality of points, means operating in accordance with the speed of the vehicle for controlling the circuit at one point, mechanical means including wayside mechanism for closing it at another point, and means for automatically throwing the mechanical means into operative position when danger conditions arise.

6. In apparatus of the character set forth, the combination with a vehicle, of traffic controlling means, an electrically controlled device for effecting the operation of the traffic controlling means, a source of electrical energy, a circuit including said source of electrical energy and the said device, said circuit being open at a plurality of points, means operating in accordance with the speed of the vehicle for controlling the circuit at one point, a switch for closing it at another point, a mechanical device along the way for engaging and actuating the switch to close the circuit, and means for automatically moving the mechanical device into position to actuate the switch when danger conditions arise.

7. In apparatus of the character set forth, the combination with a vehicle and traffic controlling means, of controlling means operating in accordance with the speed of the vehicle, a mechanical trip-operated device, and mechanism controlled by said means operating in accordance with the speed of the vehicle after the trip-operated device has been actuated for initiating the operation of the traffic controlling means.

8. In apparatus of the character set forth, the combination with a vehicle and traffic controlling means, of a movable controller for the traffic controlling means having a preliminary idle movement before causing the operation of the traffic controlling means, controlling means operating in accordance with the speed of the vehicle, a mechanical trip-operated device, and mechanism controlled by said means operating in accordance with the speed of the vehicle and said trip-operated device for operating the controller and causing it to operate the traffic controlling means a material period of time after the trip-operated device has been actuated.

9. In apparatus of the character set forth, the combination with a vehicle and traffic controlling means, of controlling means operating in accordance with the speed of the vehicle, a mechanical trip operated device, and mechanism controlled by said means operating in accordance with the speed of the vehicle and said trip-operated device for initiating the operation of the traffic controlling means when the trip-operated device has traveled a predetermined distance with the vehicle after having been actuated by a trip.

10. In apparatus of the character set forth, the combination with a vehicle and traffic controlling means therefor, of mechanism for effecting the actuation of the traffic controlling means, including a trip-operated device carried by the vehicle, and means for initiating the operation of the traffic controlling means when the trip operated device has traveled a predetermined distance with the vehicle after having been actuated by a trip.

In testimony whereof I affix my signature in the presence of two witnesses.

PAUL JOHN SIMMEN.

Witnesses:
L. RINGER,
GEORGE P. SIMMEN.